July 16, 1957     L. W. BOERNER ET AL     2,799,352
APPARATUS FOR PROPORTIONING FIRE EXTINGUISHING FOAM SOLUTIONS
Filed June 18, 1953     4 Sheets-Sheet 1
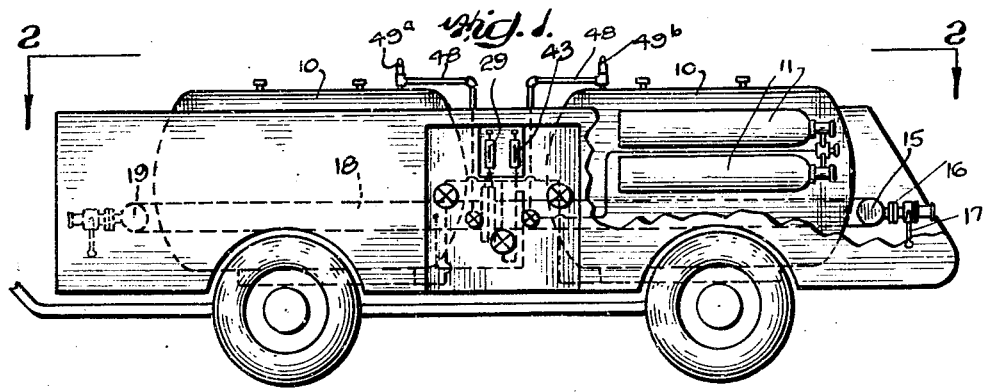
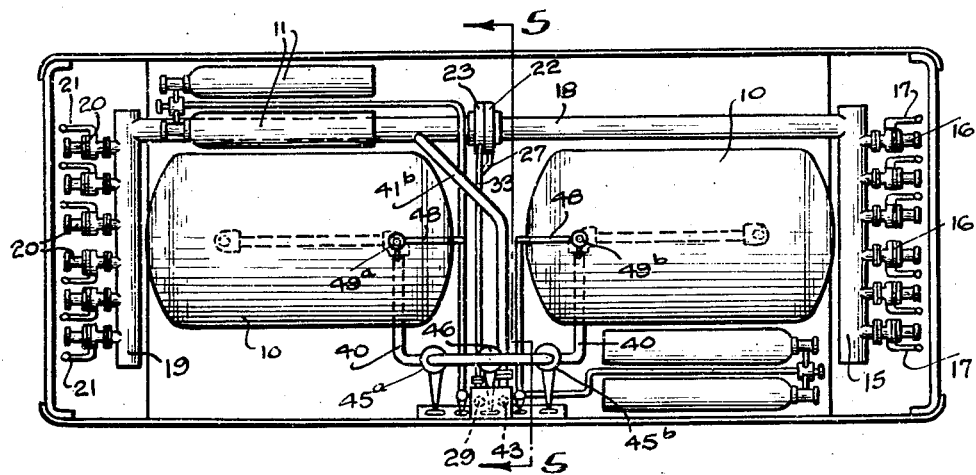
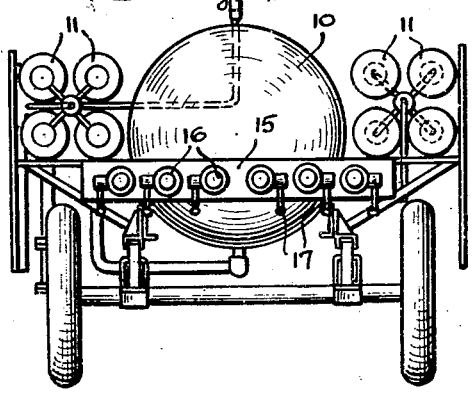
INVENTOR.
LEWIS W. BOERNER
EDWARD C. HOLMES
HARRY BRUCE MURRAY
By Leon Edelson
ATTORNEY

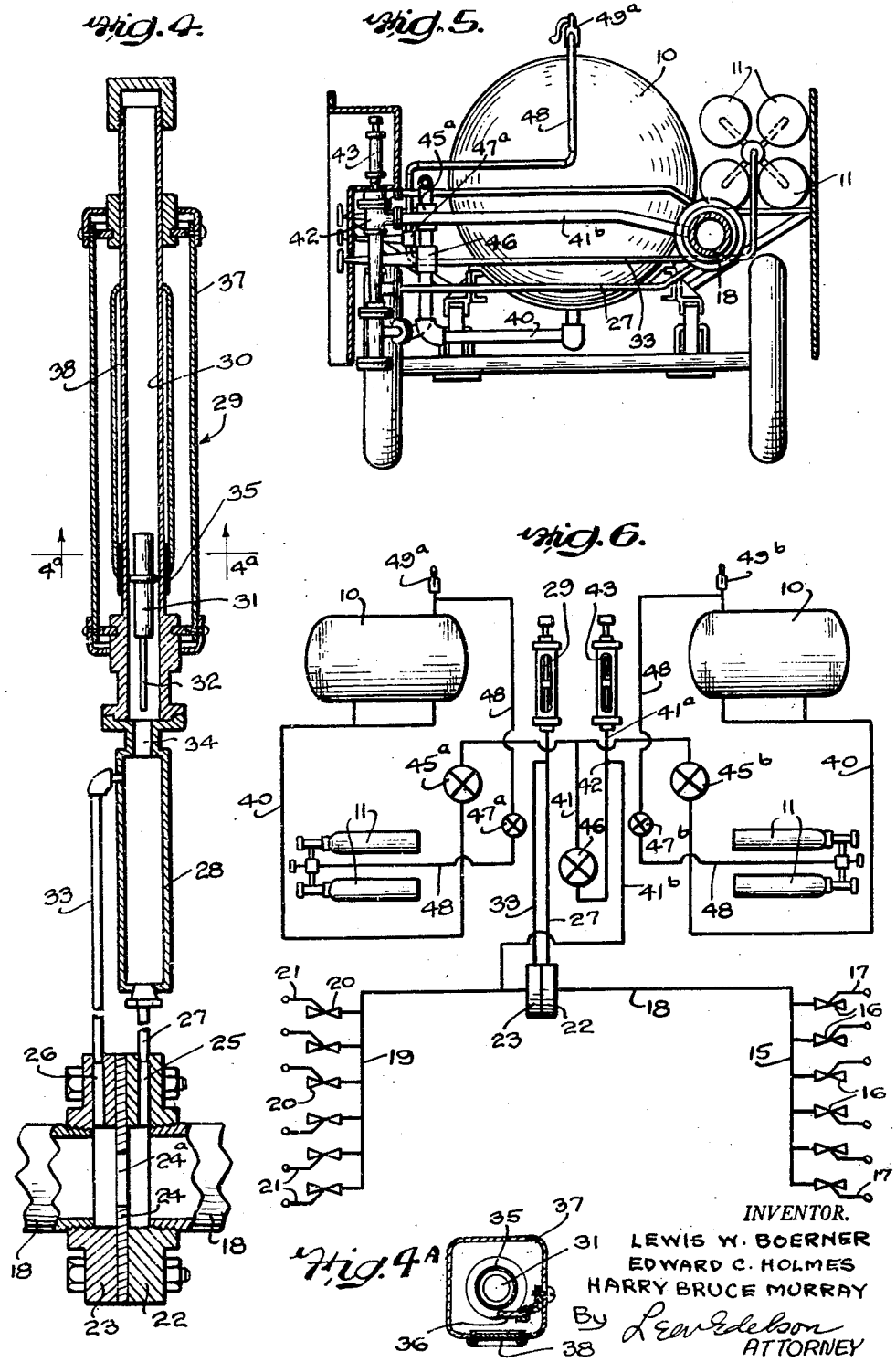

INVENTOR.
LEWIS W. BOERNER
EDWARD C. HOLMES
HARRY BRUCE MURRAY
By
ATTORNEY

United States Patent Office 2,799,352
Patented July 16, 1957

2,799,352

APPARATUS FOR PROPORTIONING FIRE EXTINGUISHING FOAM SOLUTIONS

Lewis W. Boerner and Edward C. Holmes, West Chester, and Harry Bruce Murray, Philadelphia, Pa., assignors to National Foam System, Inc., a corporation of Delaware Application June 18, 1953, Serial No. 362,606

3 Claims. (Cl. 169—14)

This invention relates generally to fire-extinguishing apparatus and more particularly to an improved apparatus for continuously producing as required an aqueous solution of foam-forming liquid for use in the production of mechanical or air foam employed in the extinguishment of fires.

In the production of so-called mechanical or air foam, the usual procedure involves flowing a high velocity stream of water laden with a foam-forming substance through a conduit system to a point or points therein where the stream is finely subdivided or dispersed and where a suitable gas (usually air from atmosphere) is entrained in the finely divided stream to form the desired fire-extinguishing foam.

In order to insure the production of foam of the desired uniform quality, it is necessary that the rate of introduction of the foam-forming material (generally in the form of a prepared liquid) into the flowing stream of water be in constant fixed proportion to the rate of flow of the water. Ordinarily, water is available for continuous supply under adequate pressure to the conflagration to be extinguished, but not so the supply of foam-forming liquid which must be replenished for introduction into the flowing stream of water to produce the desired foam-forming solution.

Apparatus has been devised heretofore for producing mechanical or air foam substantially continuously and uninterruptedly over an extended period, as may be required for the extinguishment of an extensive fire requiring the production and use of a large quantity of foam-forming solution, one such apparatus being shown and described in United States Letters Patent No. 2,405,652, granted August 13, 1946. However, while in such apparatus the foam-forming liquid is stored in two reservoirs which are alternately exhausted of and filled with the liquid for continuous injection thereof into the flowing stream of water with corresponding continuous production of fire-extinguishing foam, because of the fact that the foam-forming liquid is introduced into the water stream by the pressure differential existing between the opposite ends of a Venturi passage through which the water flows and which forces the foam-forming liquid from its reservoir into the water stream, such prior apparatus is necessarily restricted for most efficient operation to a foam discharge capacity which is more or less dependent upon its rated water input capacity. Thus, it has been found that in such prior apparatus the proper proportioning of foam-forming liquid to water flowing through the Venturi passage cannot be maintained except for a limited range of water flow for which the Venturi passage is specifically designed. Also, because of the fact that in such prior apparatus, the foam-forming liquid is forced out of its reservoir into the water stream by the pressure of a head of water diverted from the stream for such purpose, any unused liquid remaining in the reservoir eventually becomes inseparably combined with the water directed thereinto as the expressing medium and consequently is of no further value and must be discarded as waste material.

Further, in prior apparatus, such as the above mentioned, the only indication that the reservoir has been completely exhausted of its supply of foam-forming liquid is that water alone is being discharged upon the fire. Where the foam-forming solution is being directed to a foam chute from which foam is discharged into the top of a burning oil tank or the like, even such indication is not available and it may be that some considerable time may elapse before it is realized that only water and not foam is being projected to the fire. Also, should the Venturi or other water and/or foam-forming liquid passages of the apparatus become partially clogged or should control valves in the foam discharge system be improperly set, the proportion of foam-forming liquid introduced into the flowing water stream may so vary from its proper value as to result in the production of foam which is of inferior quality or of inadequate volume.

Having in mind the foregoing, it is among the principal objects of the present invention to provide an apparatus which insures the continuous and uninterrupted production over an extended period of time of an aqueous foam-forming solution in which the proportion of foam-forming liquid may be constantly maintained at a predeterminedly fixed value regardless of fluctuations in the rate of flow of water through the apparatus.

A further important object of the present invention is to provide an apparatus having means for visually indicating any deviation from the desired predetermined fixed proportion of foam-forming liquid to water and for immediately varying, as may be necessary, the rate of flow of liquid introduced into the water stream to insure the continuous production of a properly proportioned foam-forming solution.

Still another object of the present invention is to provide an apparatus for producing a continuous and uninterrupted supply of a foam-forming solution containing an exactly proportioned amount of foam-forming liquid wherein the water and foam-forming liquid are respectively passed through complementally calibrated rate-of-flow indicators to provide an immediate indication of the proportion of liquid to water in the foam-forming solution as discharged from the apparatus for delivery to the foam-producing device or devices associated therewith.

Still further, it is an object of the present invention to provide an appartus of the character aforesaid wherein is included means for insuring constant replenishment of the foam-forming liquid introduced into the water stream in predeterminedly fixed proportions without any interruption in the production of the foam-forming solution and the air foam produced therefrom and without regard to extremely wide variations in the rate of flow of water delivered to the apparatus and in the volume of foam-forming solution discharged therefrom.

Still other objects and advantages of the present invention, such as the provision of a unit which is exceedingly compact and simple in construction, which is ideally adapted for mounting upon a truck to render it quickly transportable to the vicinity of a fire to be extinguished, and which is easily operable and extremely efficient in use, will appear more fully hereinafter, it being understood that the invention consists substantially in the combination, construction, location and relative arrangement of parts, all as will be described in detail hereinafter, as shown in the accompanying drawings and as finally pointed out in the appended claims.

In the accompanying drawings:

Figure 1 is a side elevational view of a wheeled trailer equipped with apparatus as constructed in accordance with the principles of the present invention;

Figure 2 is a top plan view of the apparatus of the form shown mounted upon the trailer of Figure 1;

Figure 3 is a rear elevational view of the apparatus as shown in Figure 1;

Figure 4 is a vertical sectional view of the water rate-of-flow indicator showing its connection to the main manifold of the apparatus;

Figure 4A is a transverse sectional view as taken along the line 4a—4a of Figure 4;

Figure 5 is a transverse sectional view of the apparatus as taken along the line 5—5 of Figure 2;

Figure 6 is a schematic view showing the conduit system of the apparatus of Figure 1;

Figure 7:
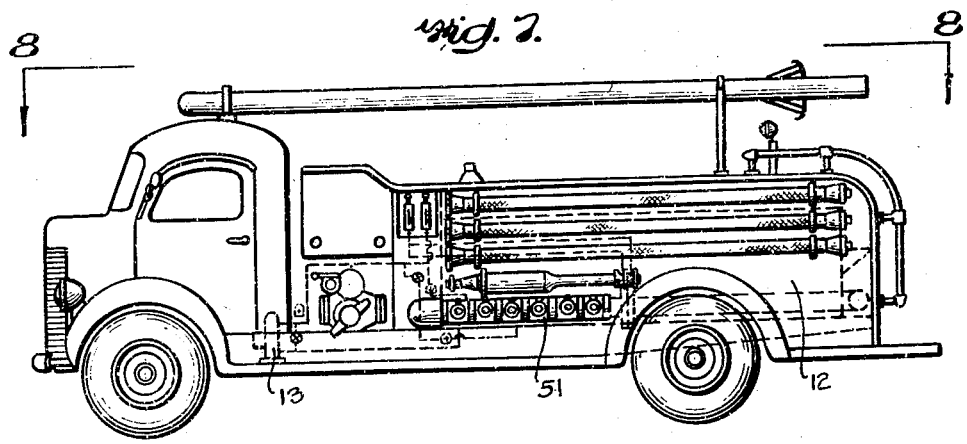
Figure 7 is a side elevational view of a self-propelled mobile truck equipped with a modified form of the apparatus of the present invention.
Figure 8:
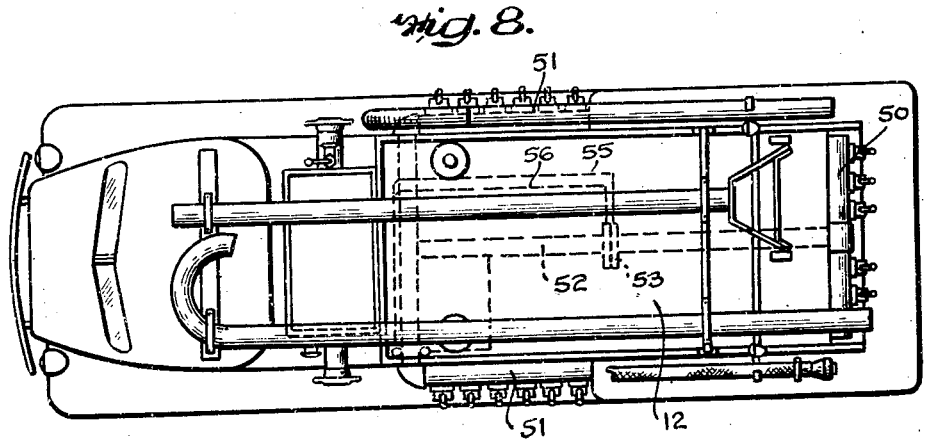
Figure 8 is a top plan view of the unit of Figure 7.
Figure 9:
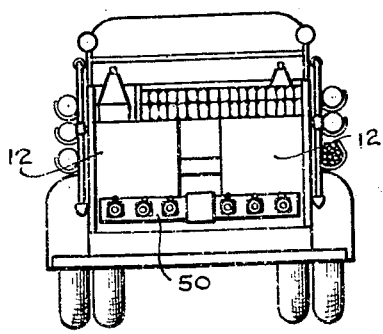
Figure 9 is a rear end view thereof.
Figure 10:
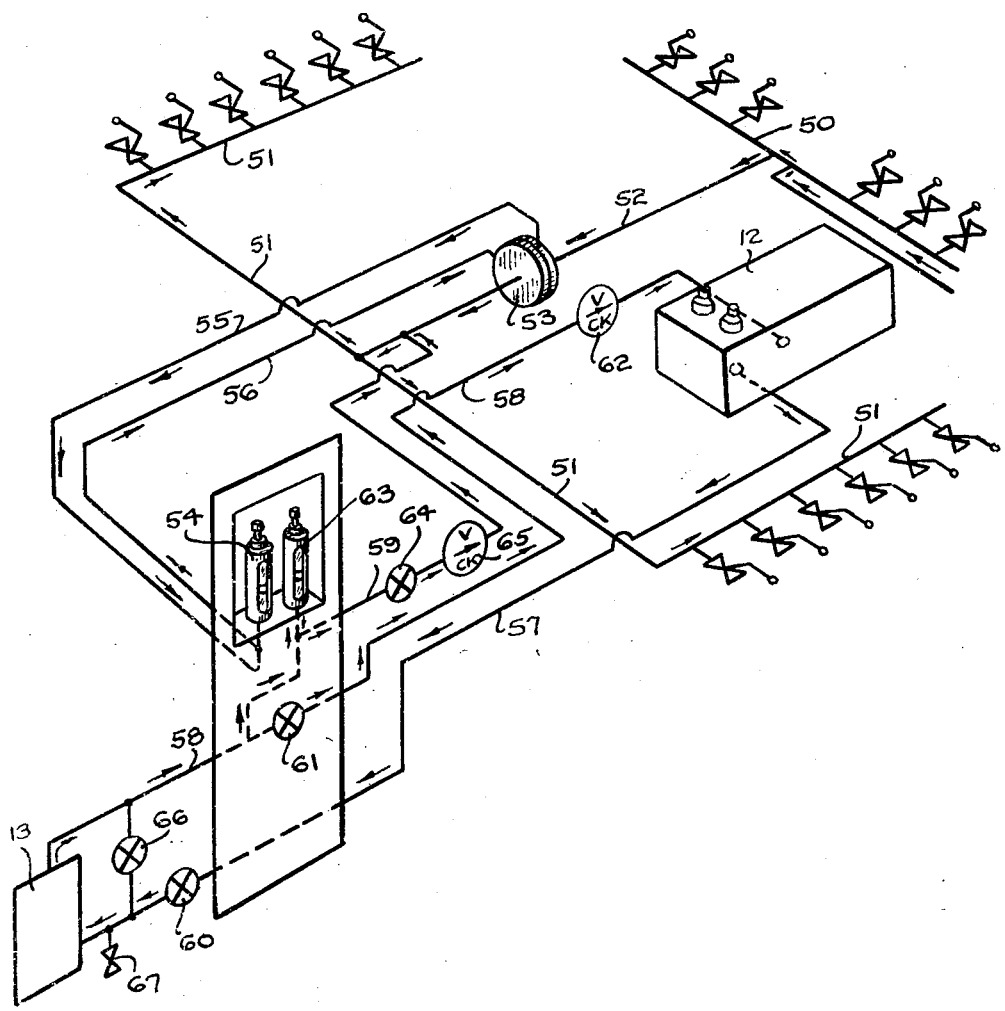
Figure 10 is a schematic view showing the conduit system of the modified appartus of Figures 8 to 10.

While in both of the forms of apparatus shown respectively in Figures 1 to 6, inclusive, and in Figures 7 to 10, inclusive, similar means are provided for controlling and indicating visually the proportionate flow of water and foam-forming liquid for producing the desired foam-forming solution, it will be noted that in the apparatus of Figures 1 to 6 the foam-forming liquid is contained in two tank-type reservoirs 10—10 of any desired, preferably equal, capacity, which are adapted to be alternately exhausted of and filled with the liquid to provide for its continuous introduction into a flowing stream of water for corresponding continuous and uninterrupted production of fire-extinguishing foam, the foam-forming liquid being forced out of its reservoir and into the water stream by a suitable fluid pressure medium, such as compressed nitrogen, suitably contained in a battery of pressure cylinders 11 conveniently mounted upon the trailer body or other suitable support, each of the liquid tanks 10—10 having associated therewith its own battery of the cylinders 11 containing nitrogen or other gas under suitably high pressure.

In the modified form of the apparatus as shown in Figures 7 to 10, the foam-forming liquid is contained in a single tank 12, the top of which may have suitable fill and vent openings which are normally open to atmosphere and by means of which the tank 12 may be kept constantly filled with liquid. This foam-forming liquid is drawn from the tank by a suction pump 13 which in turn pumps the liquid into the flowing stream of water.

In both forms of the apparatus, a portion of the water stream is diverted to and through a suitable rate-of-flow indicator device, while the foam-forming liquid is passed through a second rate-of-flow indicator device, the two devices being so complementally calibrated as to indicate at a glance whether or not the proper predetermined proportion of foam-forming liquid is being introduced into the flowing stream of water.

Referring now more particularly to the apparatus of Figures 1 to 6, it will be observed that the water for the foam-forming solution, which water may be obtained from any suitable source at the requisite operating pressure, is delivered by suitable conduits (not shown) to an intake manifold 15 suitably mounted upon the rear end of the trailer body to extend transversely thereof, this intake manifold being provided with a plurality of hose inlet connections 16 each fitted with a shut-off valve operated by an external lever 17. The water intake manifold 15 is connected by way of an intermediate manifold conduit 18 extending along one side of the trailer body to a solution discharge manifold 19 which is also provided with a plurality of hose discharge connections 20 each fitted with a shut-off valve operated by an external lever 21.

The intermediate manifold conduit 18, which is preferably of a diameter sufficient to pass with minimum friction loss as much as 1,000 G. P. M. of water, as are each of the intake and discharge manifolds 15 and 19, is interrupted intermediate its length to provide a pair of sections which are joined together by bolted coupling flanges 22—23, as is most clearly shown in Figure 4. Secured between the coupling flanges 22—23 is an orifice plate 24, having a circular orifice 24a of a diameter less than the internal diameter of the conduit 18 and disposed with its axis coincident with that of the conduit. Formed respectively in the coupling flanges 22—23 are passages 25 and 26, the inner ends of which are in communication with the interior of the conduit 18 at opposite sides of the orifice plate 24.

The passage 25 on the upstream side of the orifice plate 24 is suitably connected by a pipe 27 to the inlet end of the bottom well 28 of a rate-of-flow indicator device 29 of the construction which is well known in the art and which includes, as shown in Figures 4 and 4A, an upper extension 30 of the well 28 within which is disposed a float 31 having a depending extension rod 32. The passage 26 on the downstream side of the orifice plate 24 is connected by a pipe 33 to the top end of the well 28. This well 28 and its upper extension 30 are in communication with one another by way of an intermediate throat portion 34 of somewhat reduced diameter. The well 28 and its extension are formed of non-magnetic material, as is the float 31, the latter being, however, fitted with an imbedded armature (not shown) containing a permanent magnet. Slidably fitted upon the external wall of the nonmagnetic well extension 30 is a magnetic follower ring 35 which is attracted by and rises and falls vertically with the float-supported magnet accordingly as the float position changes in correspondence with variations in the rate of flow of water through the conduit with which the indicator device 29 is associated.

As the water flows through the reduced orifice 24a in the manifold conduit 18, a differenetial pressure is built up in the immediate region of the orifice plate, the pressure being highest on the upstream side of the plate with the result that a portion of the water flowing through the conduit is by-passed around the plate and through the rate-of-flow indicator device 29 by way of the pipes 27 and 33. Variations in the rate of flow of water through the manifold conduit 18 result in corresponding variations in the flow of the by-passed water through the indicator with corresponding changes in position of the float in the extension well. By suitably calibrating a fixed scale 36 associated with the vertically slidable magnetic follower ring 35, a direct reading may be obtained of the gallons per minute flow of water through the conduit 18.

Preferably, the extension well 30 and its slidable ring 35 are enclosed within a protective casing 37 having fitted in one wall thereof a vertically elongated sight window 38 through which the rate-of-flow reading on the scale 36 may be observed.

The foam-forming liquid contained in the reservoir tanks 10—10 is delivered selectively from either tank by a piping system which is most clearly shown in Figure 6 and which includes a pair of main lines 40—40 extending respectively from the tanks 10—10 to a common line 41 leading to a two-way coupling, as at 42, one branch of which communicates by way of a pipe 41a with the float well of a second rate-of-flow indicator device 43, which latter is in all material respects similar in design and function to the water-flow indicator 29, its principal difference being in the calibration of its scale, to which further reference will be made hereinafter. The other branch of the two-way coupling 42 is connected by way of a pipe 41b to the manifold conduit 18 on the downstream side of its orifice plate 24. Suitable shut-off valves 45a—45b are respectively included in the liquid supply lines 40—40, while a main control valve 46 is included in the common line 41 leading to the foam-forming liquid rate-of-flow indicator 43 and the manifold conduit 18. Also, control valves 47a—47b are respectively included in the supply lines 48—48 leading respectively from the two batteries of the pressurized gas cylinders 11—11 to the liquid containing tanks 10—10.

The indicator 43 is so calibrated relatively to the indicator 29 that when their respective gauges are at the same level on their respective scales the flow of foam-forming solution is in proper predetermined ratio to that of the water flow. For the production of a satisfactory fire-extinguishing foam, it is generally necessary to provide a foam-forming solution containing a predeterminedly fixed percentage of foam-forming liquid, which percentage may vary from 3 percent for certain liquids to as much as 9 percent for other liquids. Depending upon foam-forming liquid used, the proportion thereof to water is first determined for the production of a suitable foam-forming solution and the rate-of-flow indicators are then correspondingly calibrated so that equivalent readings on their respective scales indicate directly that the flow of water and the flow of foam-forming liquid into the manifold conduit 18 on the downstream side of its orifice plate are in their proper proportion. To this end the complementally calibrated indicators are preferably so mounted that when their respective follower rings are at the same level (as shown in Figure 6), it is immediately apparent that the proportional flow of water and of foam-forming liquid is correct as desired.

In operation of the apparatus of Figures 1 to 6, hose lines are first connected between the water hydrants and the intake connections 16 of the water intake manifold 15, while at the same time hose lines are also connected between the solution discharge connections 20 of the discharge manifold 19 and such foam producers as are to be employed. The valves 45ᵃ—45ᵇ, 46 and 47ᵃ—47ᵇ should, of course, all be closed, as should be the water intake and solution discharge valves. The valves on the compressed gas cylinders 11 are now all opened and regulated to provide the desired operating pressure, which may be indicated by any suitable pressure regulating valve gauge (not shown). If desired, the gas pressure supply lines may be provided with suitable safety pressure valves, such as are indicated at 49ᵃ—49ᵇ in Figure 6.

Thereupon, upon opening the water intake valves and the solution discharge valves, water is passed through the manifold conduit 18, its rate of flow therethrough being indicated on the indicator 29 by the position of its follower ring 35 in relation to its associated scale 36. Valve 47ᵃ for the first tank to be placed in operation is now opened, thereby pressurizing said tank, following which valve 45ᵃ in the liquid supply line from said tank is fully opened, permitting flow of the foam-forming liquid from the first tank to the main control valve 46.

This latter valve is then opened slowly, at the same time observing the position assumed by the follower ring (similar to member 35 of Figure 4) of the rate-of-flow indicator 43 for the foam-forming liquid. When the follower ring on the indicator 43 reaches the same level as that on the indicator 29, the proportion of liquid to water in the solution then being discharged to the foam makers will be exactly correct. Thus, by simple manipulation of the main control valve 46 the rate of flow of the foam-forming liquid may be varied at will and the proportion of liquid in the discharged solution may be maintained at a constant value. Any change in the rate of flow of water through the manifold will be immediately indicated by change in position of the follower ring of the water-flow indicator 29 and should such change occur for any reason with the result that the discharged solution does not contain the requisite percentage of foam-forming liquid, it becomes necessary only to readjust the valve 46 to provide the proper flow of liquid which would be indicated when the follower rings of both indicators 29 and 43 are again in coincidence.

When it appears that it may be necessary to produce more foam than is possible with the supply of liquid in the tank initially placed in operation, the second tank 10 should be pressurized by opening the valve 47ᵇ for controlling the supply of gas from the second battery of cylinders 11, and when the first tank has been completely exhausted of its supply of foam-forming liquid, its supply line valve 45ᵃ is closed and the second valve 45ᵇ opened, thereby supplying liquid from the second tank to the water stream through the still open main control valve 46. As soon as a given one of the pair of tanks 10—10 is exhausted of its supply of foam-forming liquid, the follower ring of the indicator 43 will drop to the bottom of its associated scale, thus visibly indicating to the operator of the apparatus that the other tank should be operatively connected into the system by opening its control valve in the line leading to the common line 41, which latter is connected by its branch line 44 to the manifold conduit 18 on the downstream side of its orifice 24ᵃ.

It will be understood, of course, that as one of the tanks 10—10 is exhausted of its supply of foam-forming liquid and the other one placed in operation, the exhausted tank is vented to atmosphere through a suitable vent valve (not shown) and is then refilled with a new supply of foam-forming liquid. Also, the battery of nitrogen cylinders 11 will be replaced by a new battery to insure an adequate supply of gas under sufficient pressure to pressurize the refilled tank preliminary to its being placed in operation. By repeating the cycle of exhausting and refilling each of the tanks, they may be alternately operated to provide a continuous and uninterrupted supply of foam-forming liquid for as long as it may be necessary to produce fire-extinguishing foam.

In the modified arrangement of the apparatus shown in Figures 7 to 10, water for the foam-forming solution is delivered from a suitable source of supply to an intake manifold 50 mounted on the rear of the truck body to extend transversely thereof, while the foam-forming solution is discharged from discharge manifolds 51—51 preferably mounted one on either side of the truck body. The intake manifold and the discharge manifolds are respectively fitted with a plurality of valve controlled hose connectors similar to those of the arrangement hereinbefore described. Interconnecting the inlet manifold 50 with each of the discharge manifolds is an intermediate manifold conduit 52 in which is included, as at 53, an orifice plate assembly similar to that shown in Figure 4 and which functions in the same manner to by-pass a portion of the water stream to the water rate-of-flow indicator 54 by way of the by-pass pipe lines 55 and 56.

The foam-forming liquid contained in the reservoir 12 is drawn therefrom by way of the conduit 57 to the suction pump 13 which in turn forces the liquid either back to the reservoir 12 by way of the return conduit 58 or through a discharge line 59 into the manifold conduit 52 on the downstream side of its orifice plate assembly, depending upon the existing operating conditions of the apparatus as will presently appear.

Included in the liquid supply line 57 leading to the suction side of the pump 13 is a shut-off valve 60, while included in the return line 58 leading to the reservoir from the pressure side of the pump is a main control valve 61 and a check valve 62. The discharge line 59, from which a portion of the foam-forming liquid is diverted to the liquid rate-of-flow indicator 63 for indicating the rate of flow of foam-forming liquid into the water stream, is also provided with a shut-off valve 64 and a check valve 65. Additionally, the system may include a pressure relief valve, as at 66, and a flush-out valve, as at 67.

It will be understood, or course, that the rate-of-flow indicators 54 and 63, the first for the water and the second for the foam-forming liquid, are respectively similar in construction and in function to the corresponding indicators of the previously described arrangement shown in Figures 1 to 6, inclusive, and conjointly indicate whether or not the discharging foam-forming solution contains the correct percentage of foam-forming liquid.

In operation of this modified arrangement of the apparatus of the present invention, the supply of foam-forming liquid in the tank 12 is constantly replenished as it is used up so that liquid is always available in the tank for the production of the required foam-forming solution. After connecting the hose lines (not shown) between the water supply source and the intake connections of the manifold 50, and the hose lines (not shown) leading from the discharge connections of the manifold 51 to the foam producers, the valves 60, 61 and 64 are all opened wide. Thereafter, the valves at the hose line connections are opened so that water is caused to flow through the manifold conduit 52 and its orifice assembly 53 for discharge from either one or both of the discharge manifolds 51—51. In this condition of the apparatus, the follower ring of the water flow indicator 54 will rise along its scale of a point indicating the quantity of water being discharged.

The suction pump 13 is thereupon started, and so long as the main control valve 61 remains wide open, the pump (which is preferably of the constant displacement, rotary type) will operate only to circulate the foam-forming liquid from its reservoir 12 to the pump and thence back to the reservoir, this because of the fact that the pressure of the water in the manifold at the point of connection therewith of the liquid discharge line 59 is so much greater than that of the liquid at said point as to prevent introduction or injection of any liquid into the water stream. Thus, so long as the valve 61 remains fully open, operation of the pump will not cause any of the foam-forming liquid to be introduced into the water stream and the flow indicator 63 will show zero flow of foam-forming liquid through the liquid discharge line 59.

However, as the main control valve 61 is slowly closed, a portion of the liquid discharged from the pump is diverted into the discharge line 59 leading to the manifold conduit 52, the pressure of the liquid in this line being approximately equal to that of the water coursing through the manifold conduit 52. As the liquid is introduced into the water stream to form the desired solution, it passes through the rate-of-flow indicator 63, and when manipulation of the main control valve 61 results in such flow of the foam-forming liquid as to cause the follower ring of the indicator 63 to coincide in level with that of the water rate-of-flow indicator 54, the foam-forming solution will then contain the correct percentage of foam-forming liquid for the requisite production of foam by the foam-producers in operation.

While the apparatus of the present invention is shown mounted upon a trailer body, as in Figure 1, and upon a self-propelled mobile truck body, as in Figure 7, it will be understood, of course, that any other suitable mounting may be provided, either mobile or stationary. Also, it is to be noted that it is not necessary to effect introduction of the foam-forming liquid into the flowing water stream at the downstream side of the orifice provided in the intermediate manifold conduit of the apparatus. In certain instances, it may be desirable or advisable to introduce the foam-forming liquid into the water stream at some suitable point upstream of the said orifice, in which case the water rate-of-flow indicator would indicate the amount of foam-forming solution discharged by the apparatus, while the liquid rate-of-flow indicator would indicate the amount of foam-forming liquid introduced into the water stream. The calibrations of the two indicators would be so correlated that when the vertically slidable indicator rings thereof are positionally coincident, that is, at the same level, they would conjointly indicate that the preparation of foam-forming liquid in the solution is in the correct amount.

Instead of manually operating the main control valves for regulating the flow of foam-forming liquid into the water stream, such regulation may be effected automatically through operation of the liquid rate-of-flow indicator, the movable element of which may operate upon a relay or other electrical or mechanical device for controlling the opening and closing of the main control valve to the extent necessary for injection of a predetermined amount of foam-forming liquid into the water stream.

It will be understood that various other changes and modifications of the present invention may be made from time to time without departing from the general principles or the real spirit thereof, and it is accordingly intended to claim the same broadly, as well as specifically, as indicated in the appended claims.

What is claimed as new and useful is:

1. Apparatus for producing a fire-extinguishing foam-forming solution comprising, in combination, means for flowing a stream of water to and for discharge from a fire-extinguishing foam producer including a conduit provided internally with a reduced diameter orifice, a reservoir for pre-mixed concentrated foam-forming liquid adapted for combining with said water to form therewith said fire-extinguishing foam-forming solution including a pair of containers adapted for storing said pre-mixed liquid under pressure, means for introducing and operable for controlling the rate of flow of said pre-mixed liquid into said water stream whereby said pre-mixed liquid and water are combined in pre-determined proportions irrespective of material fluctuations in the rate of water flow including a pair of discharge conduits operatively connecting said pre-mixed liquid containers with said water flowing conduit on the downstream side of said orifice and independently valved for placing said pre-mixed liquid containers alternately in communication with said water flowing line, and means for visually indicating instantly whether or not said water and pre-mixed liquid are being combined in the desired proportions including a pair of complementally calibrated rate of flow indicators respectively associated operatively with the water flowing and pre-mixed liquid introducing means.

2. Apparatus for producing a fire-extinguishing foam-forming solution comprising, in combination, means for flowing a stream of water to and for discharge from a fire-extinguishing foam producer including a conduit provided internally with a reduced diameter orifice, a reservoir for pre-mixed concentrated foam-forming liquid adapted for combining with said water to form therewith said fire-extinguishing foam-forming solution including a container adapted to be constantly supplied with said pre-mixed liquid, means for introducing and operable for controlling the rate of flow of said pre-mixed liquid into said water stream whereby said pre-mixed liquid and water are combined in pre-determined proportions irrespective of material fluctuations in the rate of water flow including a discharge conduit connecting said pre-mixed liquid container with said water flowing conduit on the downstream side of said orifice and having a return branch connected into said container, a pump connected into said discharge conduit for pumping the premixed liquid from said container through said discharge conduit, and means in said discharge conduit operable for directing the flow of said pre-mixed liquid through said conduit branch back into said container or optionally diverting the flow of said pre-mixed liquid from said conduit branch and directing it into said water flowing line, and means for visually indicating instantly whether or not said water and pre-mixed liquid are being combined in the desired proportions including a pair of complementally calibrated rate of flow indicators respectively associated operatively with the water flowing and pre-mixed liquid introducing means.

3. Apparatus for producing a fire-extinguishing foam-forming solution comprising, in combination, means for flowing a stream of water to and for discharge from a fire-extinguishing foam producer including a conduit provided internally with a reduced diameter orifice, a reservoir for pre-mixed concentrated foam-forming liquid adapted for combining with said water to form therewith said fire-extinguishing foam-forming solution including at least one container for said pre-mixed liquid, means for introducing and operable for controlling the rate of flow of said pre-mixed liquid into said water stream whereby said pre-mixed liquid and water are combined in pre-determined proportions irrespective of material fluctuations in the rate of water flow including discharge conduit means connecting each of said pre-mixed liquid containers with said water flowing conduit by a common connection into the latter on the downstream side of said orifice, and a control valve operable for effectively regulating the flow of pre-mixed liquid through said common connection into said water flowing conduit, and means for visually indicating instantly whether or not said water and pre-mixed liquid are being combined in the desired proportions including a pair of complementally calibrated rate of flow indicators respectively associated operatively with the water flowing and pre-mixed liquid introducing means.

References Cited in the file of this patent

UNITED STATES PATENTS

| | | |
|---|---|---|
| 1,781,299 | Prutzman | Nov. 11, 1930 |
| 2,356,286 | Timpson | Aug. 22, 1944 |
| 2,370,634 | Brewer | Mar. 16, 1945 |
| 2,439,614 | Schramm | Apr. 13, 1948 |